(12) United States Patent
Hurst

(10) Patent No.: US 6,443,209 B1
(45) Date of Patent: Sep. 3, 2002

(54) ROLL UP DOOR

(75) Inventor: William Hurst, New Holland, PA (US)

(73) Assignee: Morgan Corporation, Morgantown, PA (US)

( * ) Notice: Subject to any disclaimer, the term of this patent is extended or adjusted under 35 U.S.C. 154(b) by 0 days.

(21) Appl. No.: 09/710,515

(22) Filed: Nov. 10, 2000

(51) Int. Cl.[7] .............................. E06B 9/00
(52) U.S. Cl. .................... 160/230; 160/231.2
(58) Field of Search ................... 160/201, 230, 160/231.1, 231.2

(56) References Cited

U.S. PATENT DOCUMENTS

| | | | |
|---|---|---|---|
| 2,610,681 A | * | 9/1952 | Schaap |
| 3,870,391 A | * | 3/1975 | Nims |
| 5,564,164 A | * | 10/1996 | Jella |
| 5,738,161 A | * | 4/1998 | Martin |
| 5,915,445 A | * | 6/1999 | Rauenbusch |

OTHER PUBLICATIONS

Kemlite Company, Inc., Kemlite Material Safety Data Sheet, Feb., 1999.
3M, Material Safety Data Sheet, Feb. 1, 2000.
3M Scotch–Seal Polyurethane Adhesive Sealant, Introductory Technical Data, Feb., 1999.

* cited by examiner

*Primary Examiner*—Blair M. Johnson
(74) *Attorney, Agent, or Firm*—Elliot M. Olstein; William Squire

(57) ABSTRACT

A roll up door for trucks and the like comprises a one piece plastic sheet member which encloses the door opening. A plurality of stiffening panels are attached to the sheet member in spaced relation and preferably bonded to the sheet member. Rollers and attached axles are mounted on the panels via bores which receive the axles. The rollers ride in roll up door tracks which capture the rollers and door to the tracks in conventional fashion. The sheet member forms living hinges in the spaces between adjacent panels.

11 Claims, 4 Drawing Sheets

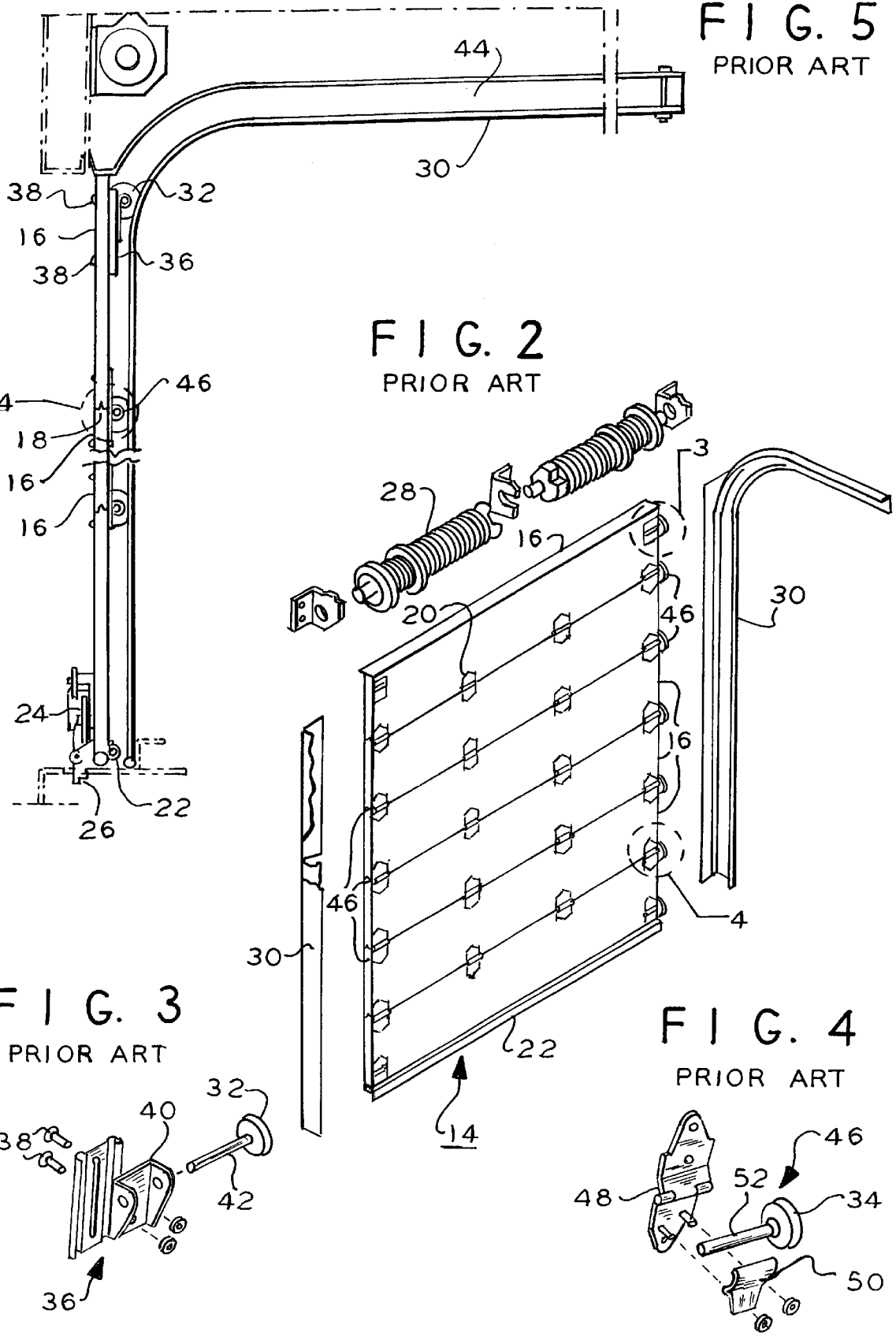

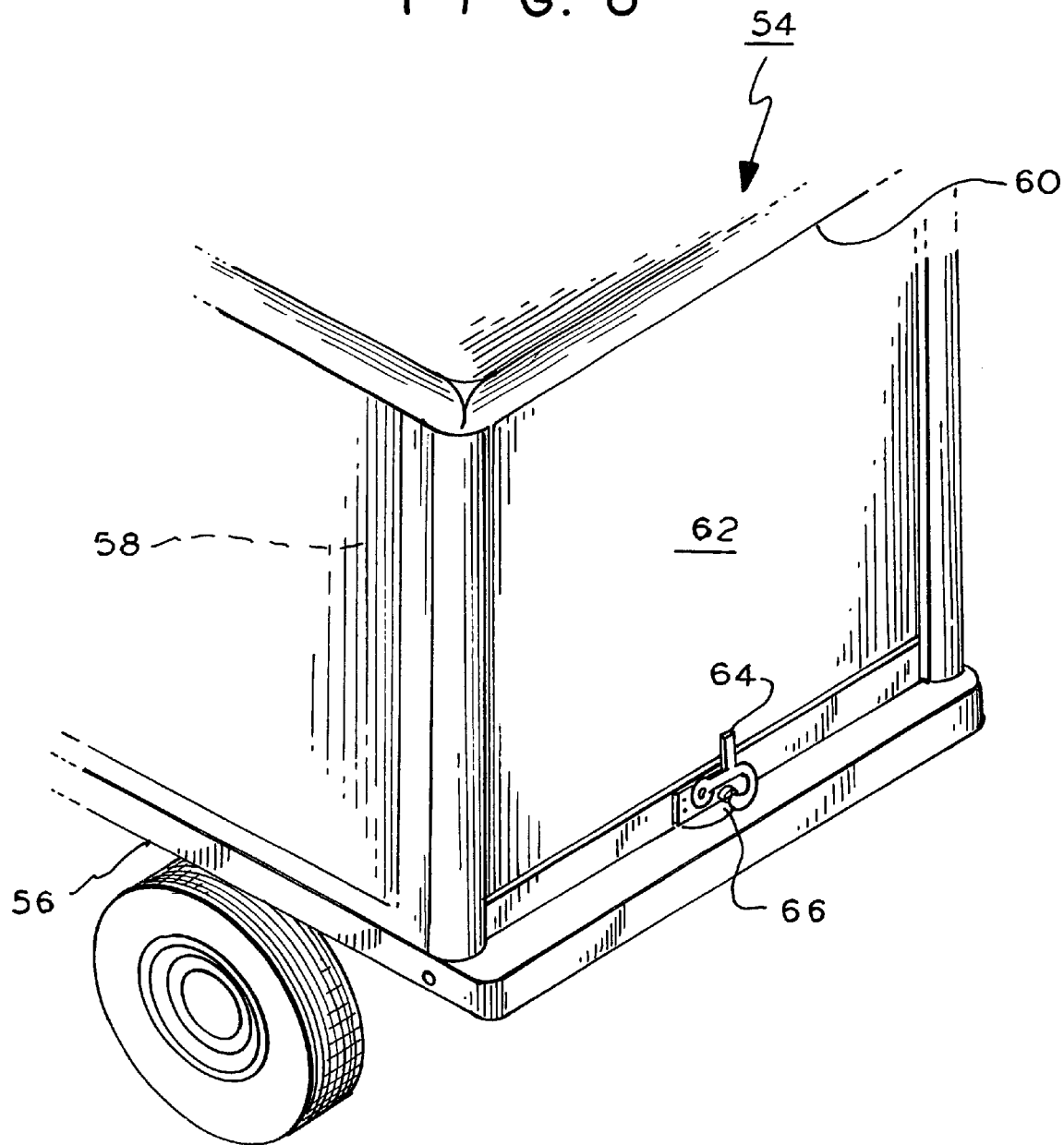

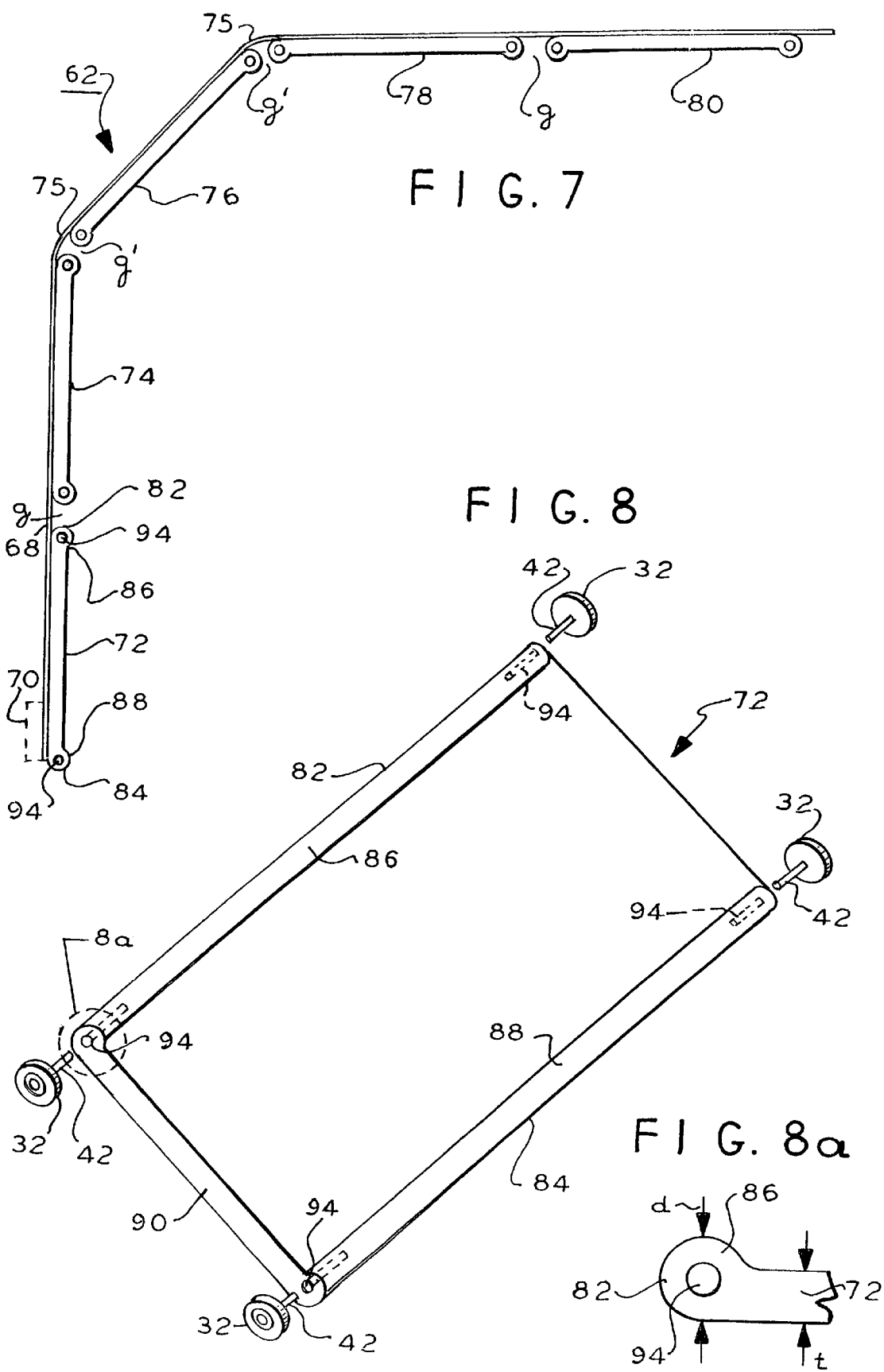

ROLL UP DOOR

This invention relates to roll up doors for use with cargo storage spaces such as on truck bodies.

Roll up doors are commonly used on trucks or trailers, but also are used in garages and the like. In FIG. 1, truck 10 has a body 12 and a conventional roll up door 14. The body typically forms a cargo storage compartment and may be on trailer. The roll up door may be used with other than truck storage bodies, such as cargo containers or buildings, for example. The roll up door 14, FIG. 2, comprises a plurality of rectangular panels 16 which may be wood, metal or other materials or combinations thereof As shown if FIG. 5, the panels 16 may have mating adjacent tongue and grooves 18 in region 4.

The panels 16 are interconnected by hinges 20. The hinges 20 are attached to the panels 20 with fasteners (not shown). These fasteners may protrude through the panel to the opposite side and may be unsightly. The door 14 has a lower sill 22 to which a handle and latch 24 are attached for latching the door to a mating latch 26 on the body 12, FIG. 1.

A conventional spring mechanism 28 preloads the door 14 to permit it to be manually raised and lowered. A pair of opposite mirror image tracks 30 receive rollers 32 and 34 attached to the panels 16 at opposite panel ends. In FIG. 3, a bracket bearing assembly 36 is bolted by bolts 38 which pass through the panels 16. These bolts are visible externally and are also unsightly. Bearing 40 receives axle 42 attached to roller 32. The roller 32 rides within track channel 44 of track 30. A similar bearing assembly is attached to the lowermost panel of panels 16 and at the opposite ends of the uppermost and lowermost panels 16. The axles rotate in the mating bearing journals.

Combined hinge and bearing assembly 46, FIG. 4, is attached between and to each pair of adjacent panels 16. In FIG. 4, the assembly 46 comprises a bracket and hinge 48 which is bolted to and between adjacent panels 16 at each end of the panels. A bearing bracket 50 is attached to the hinge 48. The hinge 48 and bracket 50 form a bearing journal for axle 52 attached to roller 34. A hinge 48, bracket 50, mating axle 52 and roller 34 are secured to each pair of adjacent panels 16 at opposite ends of the panels. The axles 42 and 52 axially slide in the mating bearings and are captured with the attached rollers by the tracks 30 and panels.

The door 14 rolls up and down the tracks 30 via the rollers captured to the tracks. The bolts securing the bearing assemblies 36 and 46 pass through the panels 16, are unsightly and also make it difficult to attach decals, silk screening decorations and indicia and the like on the door external surface. Such doors also use numerous components such as brackets, screws and bolts which add cost to the door.

The present invention is a recognition of this problem and provides a solution thereto, as well as provides a less costly door with less parts than the prior art door described above.

A roll up door for a space having a door opening and for use with spaced roller tracks adjacent to the opening according to the present invention comprises a one piece flexible sheet member dimensioned to enclose the opening and a plurality of stiffening panels secured to the flexible sheet member in a spaced array and arranged to receive rollers for engagement with the tracks whereby the flexible sheet member forms a living hinge in the space between adjacent pairs of the stiffening panels.

In one aspect, the stiffening panels have opposing first and second ends, a plurality of bores in each end, a like plurality of axles each with a wheel secured thereto for rolling in the track, an axle being receive in each bore.

In a further aspect, the stiffening panels are secured to the flexible sheet member by bonding with an adherent material.

In a further aspect, the stiffening panels and the flexible sheet member comprise plastic material.

Preferably the stiffening panels comprise a composite plastic material and have a thickness in the range of about 0.75 to about 1.0 inches. More preferably, the flexible sheet member comprises a composite plastic material having a thickness in the range of about 0.03 to inches to about 0.10 inches.

In a further aspect, the flexible sheet member comprises a sheet material with opposing planar faces. In a still further aspect, the stiffening panels each comprise a flat sheet material portion and first and second edge portions, the edge portions being semi-cylindrical in transverse shape.

Preferably the stiffening panels have a given thickness, the edge portions being defined by a diametrical dimension, the diametrical dimension being greater than the given thickness.

In a further aspect, the spacing of adjacent pairs of stiffening panels is sufficient for the flexible sheet member to bend in a direction which displaces the stiffening panels of an adjacent pair toward each other.

In a still further aspect, a roll up door according to the present invention comprises a one piece flexible sheet member for forming a doorway enclosure; a plurality of stiffening panels with opposing ends; and means for securing the panels to the sheet member in parallel spaced relation to each other and arranged to receive axles of rollers at opposing panel ends whereby the sheet member forms a living hinge in the region between adjacent panels.

IN THE DRAWING

FIG. 2 is an isometric exploded view of the roll up door assembly of FIG. 1;

Figure 1:
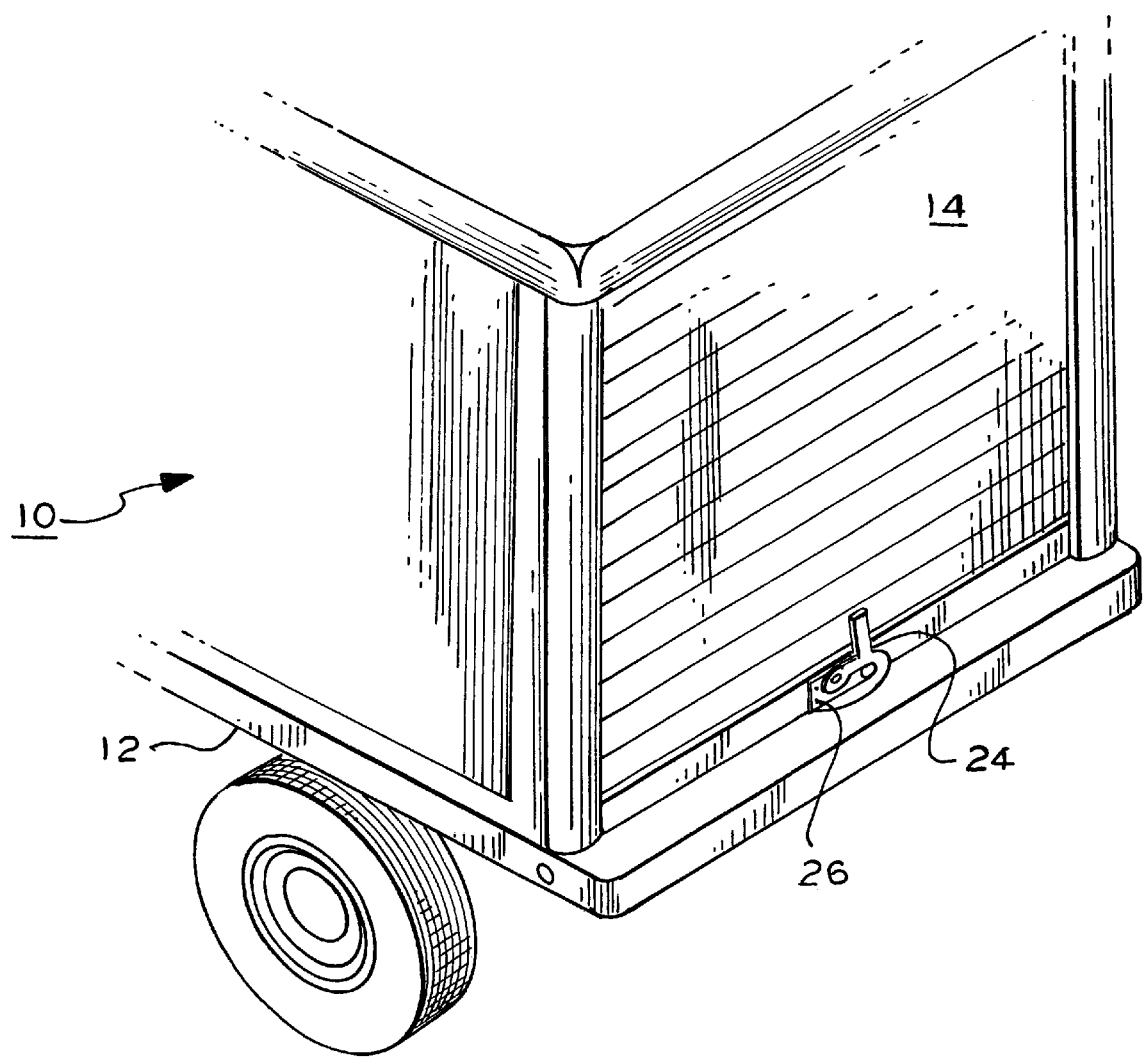
FIG. 1 is an isometric view of the rear of a truck with a conventional roll up door.

FIGS. 3 and 4 are exploded views of a roller bearing and bracket assembly taken at respective regions 3 and 4 of FIG. 2;

FIG. 5 is a side elevation fragmented view of a roller track of FIG. 2;

FIG. 6 is an isometric view of a truck rear and roll up door according to an embodiment of the present invention;

FIG. 7 is a side elevation view of the door of FIG. 6 in a partially rolled up configuration and prior to attachment to the truck and tracks;

FIG. 8 is an isometric exploded view of a representative stiffening panel and rollers employed with the door of FIG. 7; and FIG. 8a is a more detailed view of an end portion of the stiffening panel of FIG. 8 taken at region 8a.

In FIG. 6, truck 54 has a body 56 defining a cargo space 58 and opening 60 to the space 58. The opening 60 is closed by a roll up door 62 according an embodiment of the present invention. The door 62 is latched closed by conventional handle latch 64 and mating catch 66 on the body 56.

In FIG. 7, door 62 is secured to the conventional roller tracks 30, FIG. 2, by conventional rollers 32 and axle 42. None of the remaining hardware components of FIGS. 2, 3 and 4 are used with the door 62. The door 62 comprises an external sheet member 68. Sheet member 68 is flexible and is commercially available as a plastic composite material. This composite material is preferred, but the member 68 may be any flexible sheet material that has a useful life that can withstand the rigors of normal weather conditions to which the door is exposed with the repetitive use of the door. The plastic material is desirable as it has long life and meets the environmental and duty cycle requirements of a roll up door on a truck. The door member 68 must withstand numerous flexures during its useful life without significant corrosion, cracking, crazing, discoloration, warping or other deleterious effects on the material. The member 68 has an overall length and width dimensioned as a typical roll up door for enclosing the cargo space opening 60. A bottom sill 70 (shown in phantom) and latch mechanism (not shown in this figure) attached to the sill are attached to the lowermost portion and externally of the member 68 and stiffening panel 72. The sheet member 68 is preferably 1/16 inch thick composite plastic material, such as fiberglass filled thermoplastic or thermoset plastic material or other reinforced plastic material. Such material is commercially available. The thickness t, FIG. 8a, of the material may vary in a range of about 0.03 inches to about 0.10 inches, and preferably is about 0.06 inches, according to a given implementation so that the sheet material may bend at bends 75, FIG. 7, as the door is rolled up the tracks 30 (FIG. 2).

The door 62 also comprises a plurality of stiffening panels 72, 74, 76, 78 and 80 which in this embodiment are identical, but may differ from one another according to a given implementation. Representative panel 72, FIG. 8, is rectangular in plan view and is of uniform thickness except for the edges 82, 84. The edges 82, 84 are mirror images of each other and comprise semi-cylindrical elements 86, 88, respectively. The elements 86, 88 extend for the length of the panel 72. Opposite sides 90 and 92 of panel 72 are flat and parallel in their entirety. The elements 86 and 88 have a diametrical dimension d, FIG. 8a, that is greater than the thickness of the panel 72. This greater diametrical dimension d is provided so that an axle receiving bore 94 is formed in the elements 86 and 88 at sides 90 and 92. The bores 94 each receive a corresponding axle 42.

The stiffening panels are preferably plastic material, and more preferably composite plastic material. However, the stiffening panels may comprise any preferably rigid panel material such as wood, particle board, sheet metal or any other suitable stiffening material. The edge elements 86 and 88 are preferred for plastic molded panels, but this material is optional. The thickness at the edges 82 and 84 may be thicker than the panel thickness between the elements or may be of the same thickness throughout according to the type of material used. The panels are preferably bonded with an adhesive to the sheet member 68, but if desired, may be attached with rivets, bolts or other fasteners. Such fasteners are not as desirable as bonding, since the fasteners mar the surface finish of the sheet material external surface and also provide possible moisture penetration, which is not desirable. In this case additional seals may be used if desired.

The axles 42 are captured in the bores 94 when the door 62 is assembled to the tracks such as tracks 30, FIG. 2. The tracks 30 receive the rollers 32 and axially retrain the rollers along the axial direction of the axles 42. Since the tracks 30 at opposite sides of the door have a fixed location, the door 62, axles 42 and rollers 32 are captured to the tracks in conventional fashion.

The panels 72, 74, 76 and so on, are spaced apart a gap g, when the panels are coplanar such as panels 72 and 74 or 78, 80. The gap g must be sufficiently large so as to permit the gap g to decrease in value at the bends 75 at gaps g'. The adjacent edges of the panels 74, 76 and 78 at gaps g' may be spaced or contiguous, spacing being preferred to allow for variations in tolerances. Since the sheet member 68 is one piece, no gaps are present in the door whether or not the door is down or rolled up as occurs in prior art paneled doors as shown in FIGS. 1 and 2. This also uses considerably less hardware and is less costly to fabricate and maintain than the prior art doors.

It will occur to one of ordinary skill that modifications may be made to the disclosed embodiments without departing from the scope of the invention as defined in the appended claims. The disclosed embodiments are given by way of illustration and not limitation.

What is claimed is:

1. A roll up door for a space having a door opening and for use with spaced roller tracks adjacent to the opening comprising:
    a one piece flexible sheet member dimensioned to enclose the opening; and
    a plurality of stiffening panels secured to the flexible sheet member in a spaced array and arranged to receive rollers for engagement with the tracks whereby the flexible sheet member forms a living hinge in the space between adjacent pairs of the stiffening panels, the stiffening panels each comprising a flat sheet material portion and first and second edge portions, the edge portions being raised above the plane of the stiffening panels at a panel surface opposite the flexible sheet member for receiving rollers.

2. The door of claim 1 wherein the stiffening panels have a bore in each further portion, further including a plurality of axles each with a wheel secured thereto for rolling in the track, an axle being received in each bore.

3. The door of claim 1 wherein the stiffening panels have opposing ends and wherein the edge portions extend for the entire length of the corresponding edge between the ends, the further portion being raised for at least a portion of said entire length.

4. The door of claim 1 wherein the further portion has a geometric outer peripheral shape in transverse section.

5. The door of claim 4 wherein the outer peripheral shape is semi-cylindrical.

6. The door of claim 3 wherein the further portion extends for the entire length between said ends.

7. The door of claim 1 wherein the panels each comprise a sheet material with opposing planar faces.

8. The door of claim 1 wherein the edge portions are semi-cylindrical in transverse shape.

9. The door of claim 8 wherein the stiffening panels have a given thickness, the edge portions being defined by a diametrical dimension, the diametrical dimension being greater than the given thickness.

10. The door of claim 1 wherein the spacing of adjacent pairs of stiffening panels is sufficient for the flexible sheet member to bend in a direction which displaces the stiffening panels of an adjacent pair toward each other.

11. A roll up door for a space having a door opening and for use with spaced roller tracks adjacent to the opening comprising:

a one piece flexible sheet member dimensioned to enclose the opening; and a plurality of stiffening panels secured to the flexible sheet member in a spaced array and arranged to receive rollers for engagement with the tracks whereby the flexible sheet member forms a living hinge in the space between adjacent pairs of the stiffening panels, the stiffening panels each having a face defining a plane opposite the sheet member and first and second edge portions semi-cylindrical in transverse shape, the edge portions each including a further portion formed of the material of the panel and raised above the plane of the face for receiving the rollers;

the stiffening panels having a given thickness, the edge portions being defined by a diametrical dimension, the diametrical dimension being greater than the given thickness.

* * * * *